(12) United States Patent
Hsieh

(10) Patent No.: US 11,690,452 B2
(45) Date of Patent: Jul. 4, 2023

(54) LASHING DEVICE

(71) Applicant: FORMOSA FORGES CORPORATION, Nan Tou (TW)

(72) Inventor: Jung-Kuang Hsieh, Taichung (TW)

(73) Assignee: Formosa Forges Corporation, Nan Tou (TW)

( * ) Notice: Subject to any disclaimer, the term of this patent is extended or adjusted under 35 U.S.C. 154(b) by 0 days.

(21) Appl. No.: 17/830,017

(22) Filed: Jun. 1, 2022

(65) Prior Publication Data
US 2023/0133713 A1 May 4, 2023

(30) Foreign Application Priority Data
Oct. 29, 2021 (TW) ................. 110140436

(51) Int. Cl.
  *B63B 25/28* (2006.01)
  *A47B 97/00* (2006.01)
  *F16F 9/06* (2006.01)
(52) U.S. Cl.
  CPC ........ *A47B 97/00* (2013.01); *A47B 2097/008* (2013.01); *F16F 9/06* (2013.01)
(58) Field of Classification Search
  CPC .............. A47B 97/00; A47B 2097/008; A47B 2097/003; F16F 9/06; F16F 9/061; F16G 15/02; B63B 25/28; B63B 25/004; B63B 2025/285
  USPC .............. 248/351, 499; 410/68, 77, 97, 100; 114/75; 24/265 CD
  See application file for complete search history.

(56) References Cited

U.S. PATENT DOCUMENTS

| | | | | |
|---|---|---|---|---|
| 2,353,017 A | * | 7/1944 | Denton | B63B 25/28 410/2 |
| 5,137,405 A | * | 8/1992 | Klein | B61D 45/003 410/94 |
| 5,288,187 A | * | 2/1994 | Ward | B60P 7/13 24/68 CD |
| 6,565,299 B1 | * | 5/2003 | Guilbault | B60P 7/13 410/1 |

(Continued)

FOREIGN PATENT DOCUMENTS

CN 207466908 U 6/2018

OTHER PUBLICATIONS

Office Action, which was issued to Chinese counterpart application No. 202122945165.4 by the CNIPA dated Feb. 25, 2022, with an English translation thereof.

*Primary Examiner* — Nkeisha Smith
(74) *Attorney, Agent, or Firm* — Michael Best & Friedrich LLP

(57) ABSTRACT

A lashing device includes: a base seat having a bottom wall, and two pivot lugs which cooperate with the bottom wall to define a pivot slot thereamong, and each of which is formed with an pivot hole communicating with the pivot slot; a pivot pin extending through the pivot hole of each of the pivot lugs; and an eye plate received in the pivot slot, and having a middle portion that is formed with a pivot hole provided for the pivot pin to movably extends therethrough, and first and second wing portions which are connected to opposite ends of the middle portion, respectively, and each of which has an elongated hole having an arc section. The arc axes of the arc sections of the elongated holes are aligned with the center axis of the pivot hole.

10 Claims, 20 Drawing Sheets

(56) References Cited

U.S. PATENT DOCUMENTS

| | | | | |
|---|---|---|---|---|
| 6,669,417 | B2* | 12/2003 | Hsieh | B63B 25/004 |
| | | | | 410/96 |
| 10,472,023 | B2* | 11/2019 | Hsieh | B63B 25/004 |
| 2019/0017564 | A1* | 1/2019 | Sekine | F16F 9/516 |
| 2019/0021497 | A1* | 1/2019 | Sekine | A47B 95/00 |
| 2020/0229601 | A1* | 7/2020 | Ishihara | A47B 97/00 |

* cited by examiner

LASHING DEVICE

CROSS-REFERENCE TO RELATED APPLICATION

This application claims priority of Taiwanese Patent Application No. 110140436, filed on Oct. 29, 2021.

FIELD

The disclosure relates to a lashing device, and more particularly to a lashing device for securing containers.

BACKGROUND

In general, containers loaded on a cargo ship are stacked into rows and columns. In order to prevent the stacked containers from falling when the cargo ship is in motion, a plurality of lashing devices (e.g., as disclosed in Taiwanese Patent Nos. 1250956, M284618, and 1245730) are generally used to secure the containers to a deck of the cargo ship.

Referring to FIGS. 1 and 2, the deck of a conventional cargo ship generally includes a plurality of fixing seats 2 that are provided to be connected to a plurality of lashing devices 3 via a plurality of eye plates 1. Specifically, each of the eye plates 1 is welded to top and side surfaces of a respective one of the fixing seats 2, and has a plurality of circular holes 101. Each of the lashing devices 3 is connected between a container 6 and a respective one of the eye plates 1, and includes a turnbuckle 4 and a lashing rod 5. The turnbuckle 4 of each of the lashing devices 3 is pivotally engaged with a respective one of the circular holes 101 of the eye plates 1 via a pivot pin 401. The lasing rod 5 of each of the lashing devices 3 has a hook end 501 that is engaged with a corner casting 601 of the container 6, and an opposite end that is adjustably connected to the turnbuckle 4.

Referring to FIGS. 3, 4A and 4B, although the above-described system of the eye plates 1 and the lashing devices 3 is able to secure the containers 6 to the deck, when the cargo ship becomes unstable (e.g., due to heavy winds or strong currents) and exerts an impact force (F) (see FIG. 3) on the containers 6, the containers 6 are subjected to an inertia force thereof (see the dotted arrow in FIG. 3) to thereby move in a direction opposite to the direction of the impact force (F). As a result, the containers 6 exert a pulling force on the lashing devices 3, which can easily damage the lashing rods 5 of the lashing devices 3 or the corner castings 601 of the containers 6. Moreover, when the pulling force is no longer present, the containers 6 are likely to tilt and fall off the deck, as shown in FIG. 4B.

Furthermore, since the containers 6 may be disposed at different heights which causes the lashing devices 3 to incline relative to the deck at different angles, a distance between two adjacent lashing rods 5 may vary accordingly. As a result, the fingers of an operator may be accidentally caught between and injured by the lashing rods 5 when operating on the lashing devices 3.

Such drawback can be found in the lashing device disclosed in German Patent No. DE202017103865U1, and although the lashing device disclosed in Taiwanese Patent No. 1641770 is able to overcome the drawback, the eye plate thereof is subjected to unevenly distributed forces.

SUMMARY

Therefore, the object of the disclosure is to provide a lashing device that can alleviate the drawback of the prior art.

According to the disclosure, the lashing device includes a base seat, a pivot pin, and an eye plate.

The base seat has a bottom wall, and two spaced-apart pivot lugs that are connected to the bottom wall, and that cooperate with the bottom wall to define a pivot slot thereamong. Each of the pivot lugs is formed with an pivot hole that communicates with the pivot slot. The pivot holes extend along a center axis. The pivot pin extends through the pivot hole of each of the pivot lugs. The eye plate is received in the pivot slot, and has a middle portion, a first wing portion and a second wing portion. The middle portion is formed with a pivot hole. The pivot pin movably extends through the pivot hole such that the eye plate is rotatable about the pivot pin relative to the base seat. The first wing portion has a first connecting end that is connected to one of opposite ends of the middle portion, a first distal end that is distal from the middle portion, and a first elongated hole that is disposed between the first connecting end and the first distal end. The first elongated hole has a first arc section that is centered at a first arc axis. The second wing portion has a second connecting end that is connected to the other one of the opposite ends of the middle portion, a second distal end that is distal from the middle portion, and a second elongated hole that is disposed between the second connecting end and the second distal end. The second elongated hole has a first arc section that is centered at a first arc axis. The first arc axis of the first arc section of the first elongated hole and the first arc axis of the first arc section of the second elongated hole are coplanar with the center axis, and are equidistant from the center axis.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
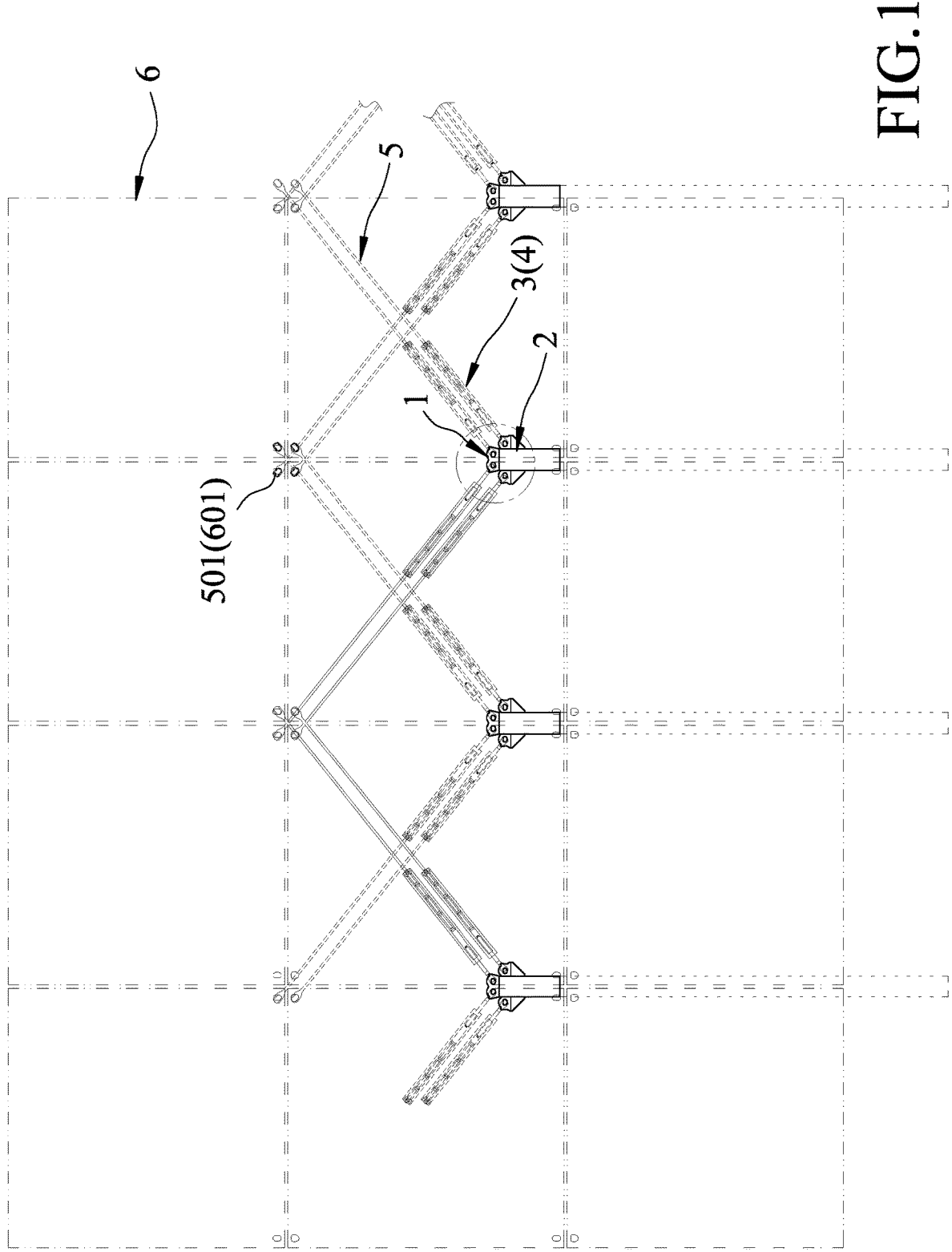
FIG. 1 is a schematic diagram illustrating a plurality of conventional lashing devices being used for securing a plurality of containers.
Figure 2:
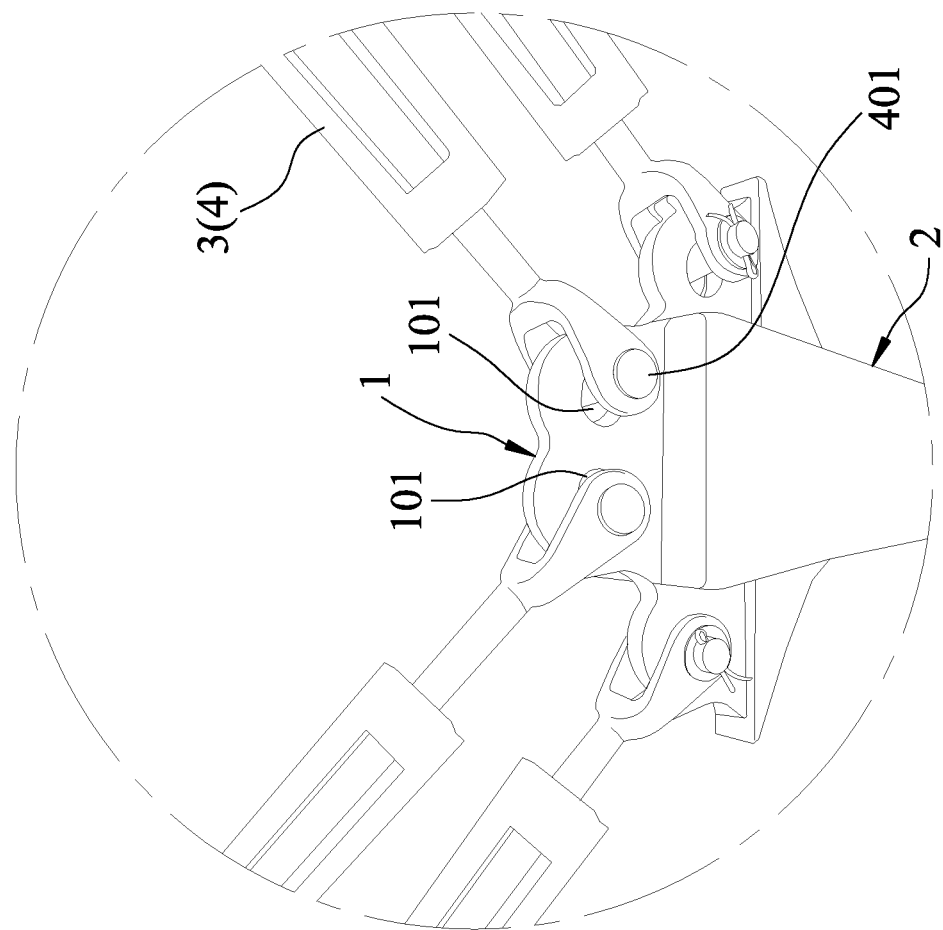
FIG. 2 is an enlarged fragmentary view of FIG. 1.
Figure 3:
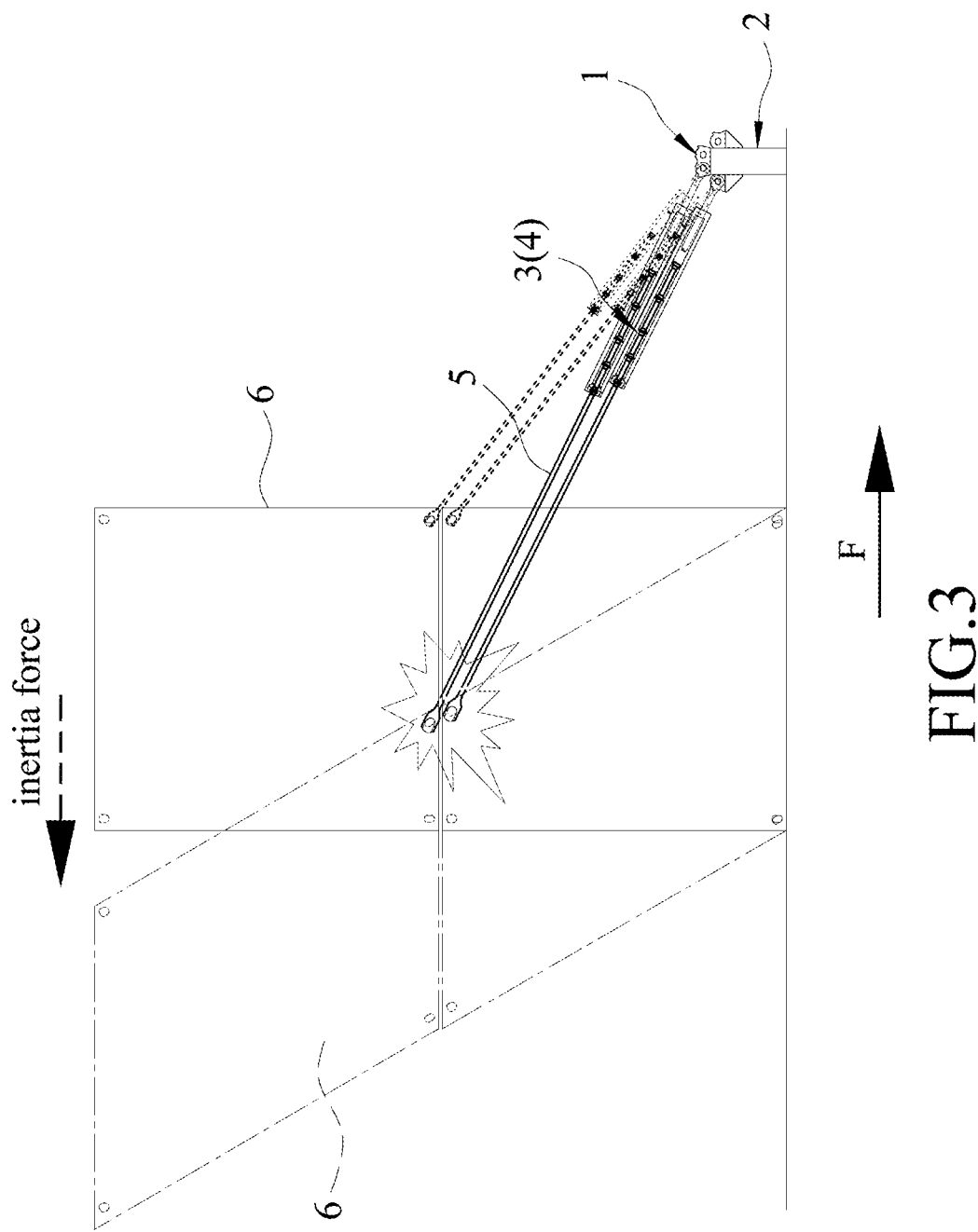
FIG. 3 is a schematic diagram illustrating the lashing devices and the containers being subjected to an impact force.
Figure 4B:
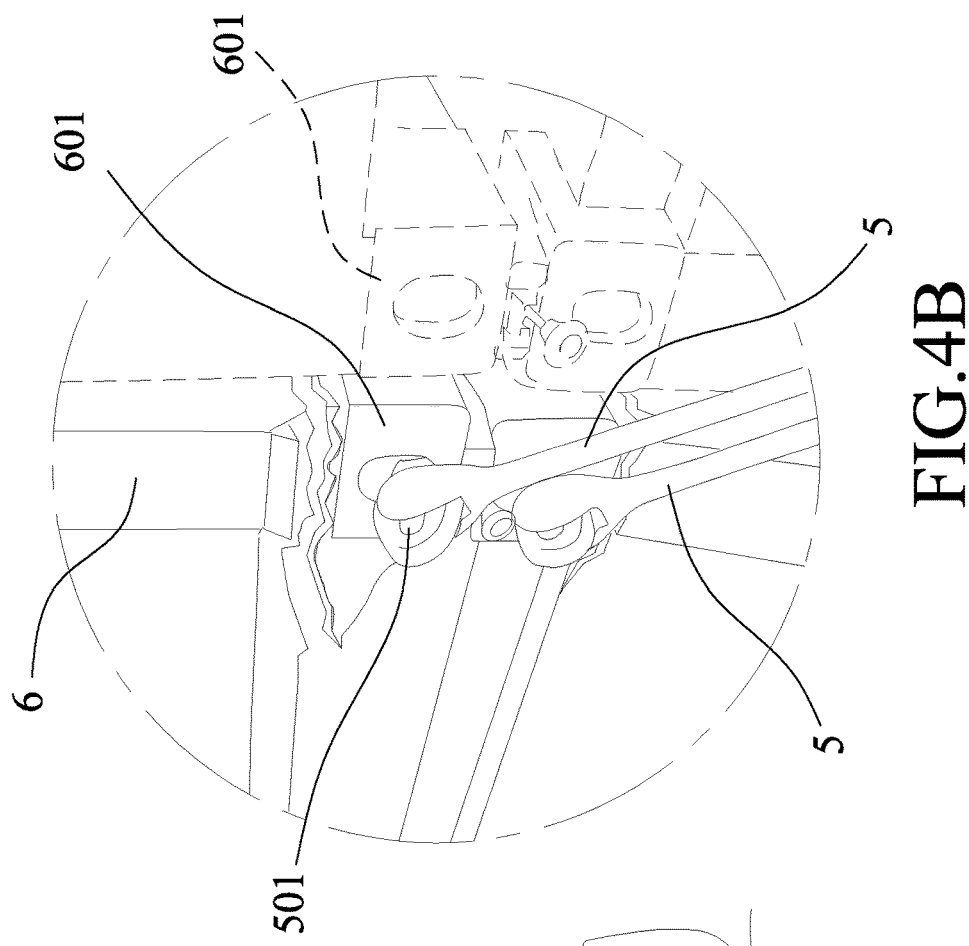
FIG. 4B is a schematic diagram illustrating a corner casting of one of the containers being pulled and damaged.
Figure 4A:
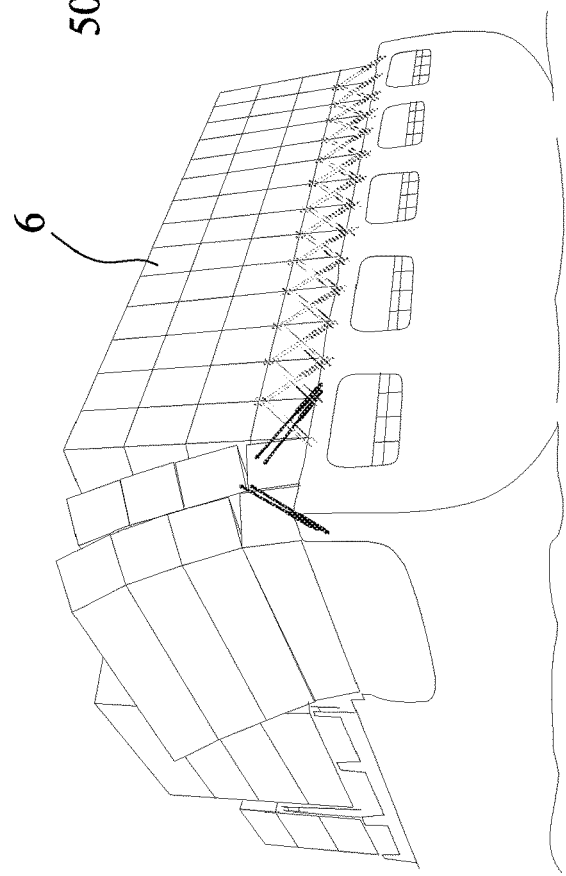
FIG. 4A is a schematic diagram illustrating the tilting of the containers.
Figure 5:
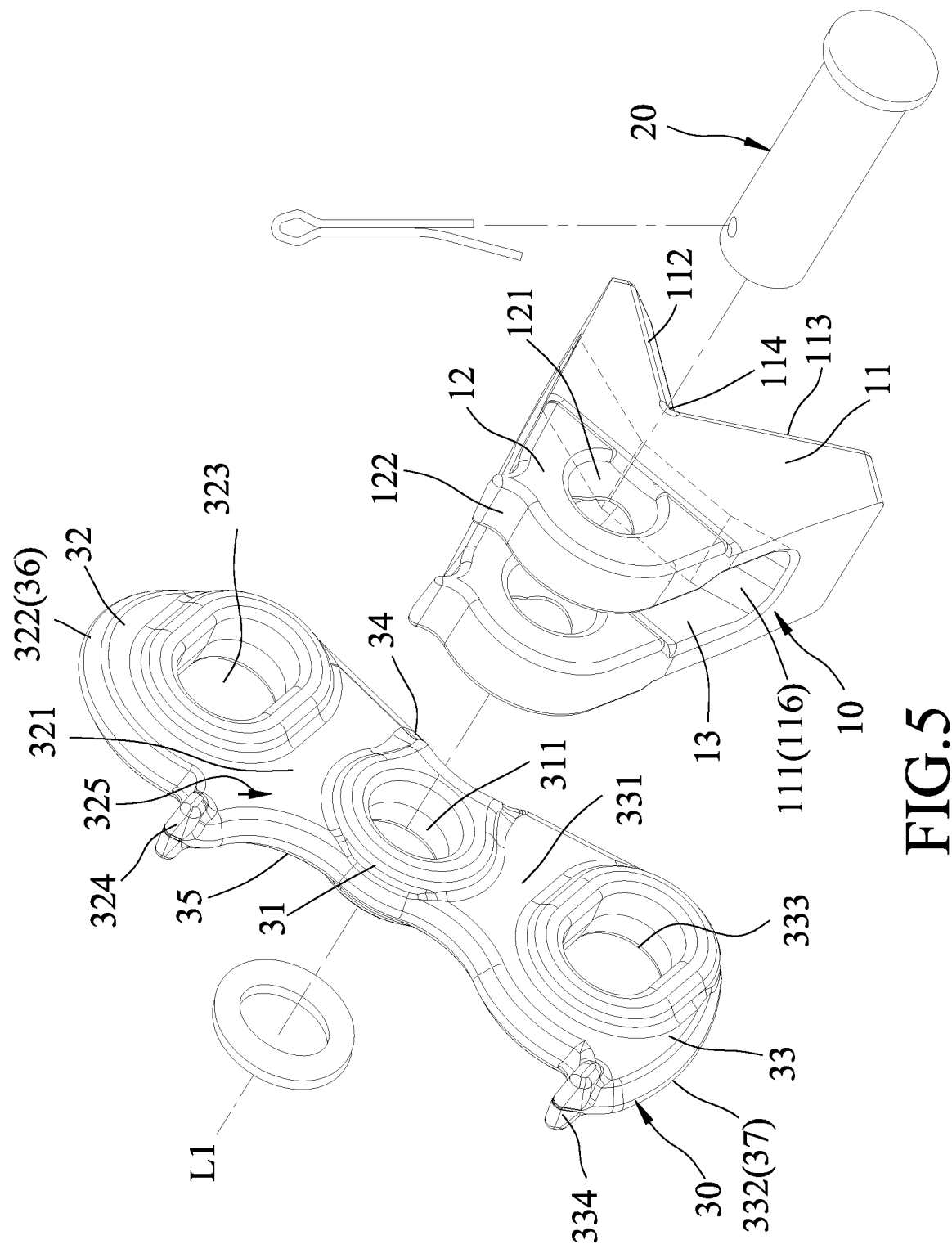
FIG. 5 is an exploded perspective view of a first embodiment of the lashing device according to the disclosure.

Before the present disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 5 to 9, a first embodiment of a lashing device according to the disclosure is adapted to be fixed to an upright post 100. The upright post 100 has two end corners 110 that are disposed at a top end of the upright post 100, and that are substantially right-angled. The lashing device is adapted to be fixed to one of the end corners 110 of the upright post 100, and includes a base seat 10, a pivot pin 20, and an eye plate 30.

The base seat 10 has a bottom wall 11, and two spaced-apart pivot lugs 12 that are connected to the bottom wall 11, and that cooperate with the bottom wall 11 to define a pivot slot 13 thereamong.

The bottom wall 11 of the base seat 10 has a top surface 111 that is exposed to the pivot slot 13, and first and second contact surfaces 112, 113 that are opposite to the top surface 111, that intersect each other on a corner line 114, and that are substantially perpendicular to each other. The top surface 111 has a flat segment 115, and two slanted segments 116 that are connected to opposite ends of the flat segment 115, respectively. Each of the slanted segments 116 extends from an end that is connected to the flat segment 115 toward a distal end in a direction away from both the flat segment 115 and the pivot lugs 12 such that the slanted segments 116 are inclined relative to the flat segment 115.

Each of the pivot lugs 12 is formed with a pivot hole 121 that communicates with the pivot slot 13, and has an indicating segment 122. The pivot holes 121 extend along a center axis (L1). Each of the pivot lugs 12 extends along an imaginary extending line (L2) that intersects the center axis (L1), and that is inclined relative to an imaginary extension of the first contact surface 112 (see FIG. 7). As such, a tilt angle (θ1) (see FIG. 7) is formed between the extending line (L2) of each of the pivot lugs 12 and the imaginary extension of the first contact surface 112, and ranges from 40 degrees to 50 degrees (preferably 45 degrees). An imaginary plane that overlaps the corner line 114 and the second contact surface 113 is inclined relative to the center axis (L1), such that an installation angle (θ2) (see FIG. 9) is formed between the imaginary plane and the center axis (L1). The installation angle (θ2) is adjustable during manufacture to suit actual needs.

The pivot pin 20 extends through the pivot hole 121 of each of the pivot lugs 12. The eye plate 30 is received in the pivot slot 13, and has a middle portion 31, a first wing portion 32, a second wing portion 33, a bottom edge 34, a top edge 35, a first side edge 36 and a second side edge 37.

The middle portion 31 is formed with a pivot hole 311 that extends along the center axis (L1). The pivot pin 20 movably extends through the pivot hole 311 such that the eye plate 30 is rotatable about the pivot pin 20 relative to the base seat 10. The bottom edge 34 is proximal to the bottom wall 11 of the base seat 10. The top edge 35 is opposite to the bottom edge 34. The first and second wing portions 32, 33 are connected to opposite ends of the middle portion 31, respectively. The first side edge 36 is connected between the bottom edge 34 and the top edge 35 and is disposed at the first wing portion 32. The second side edge 37 is connected between the bottom edge 34 and the top edge 35 and is disposed at the second wing portion 33.

Specifically, the first wing portion 32 has a first connecting end 321 that is connected to one of opposite ends of the middle portion 31, a first distal end 322 that is distal from the middle portion 31 and that is disposed at the first side edge 36, a first elongated hole 323 that is disposed between the first connecting end 321 and the first distal end 322, a first stopper 324 that protrudes from the top edge 35, and an indicator 325 that corresponds in position to the indicating segment 122 of the base seat 10. The first elongated hole 323 has a first arc section 326 that is centered at a first arc axis (L3), and a second arc section 327 that is centered at a second arc axis (L4).

The second wing portion 33 has a second connecting end 331 that is connected to the other one of the opposite ends of the middle portion 31, a second distal end 332 that is distal from the middle portion 31 and that is disposed at the second side edge 37, a second elongated hole 333 that is disposed between the second connecting end 331 and the second distal end 332, and a second stopper 334 that protrudes from a connecting section between the top edge 35 and the second side edge 37. The second elongated hole 333 is of the same size and shape as the first elongated hole 323, and has a first arc section 336 that is centered at a first arc axis (L3), and a second arc section 337 that is centered at a second arc axis (L4).

Figure 6:
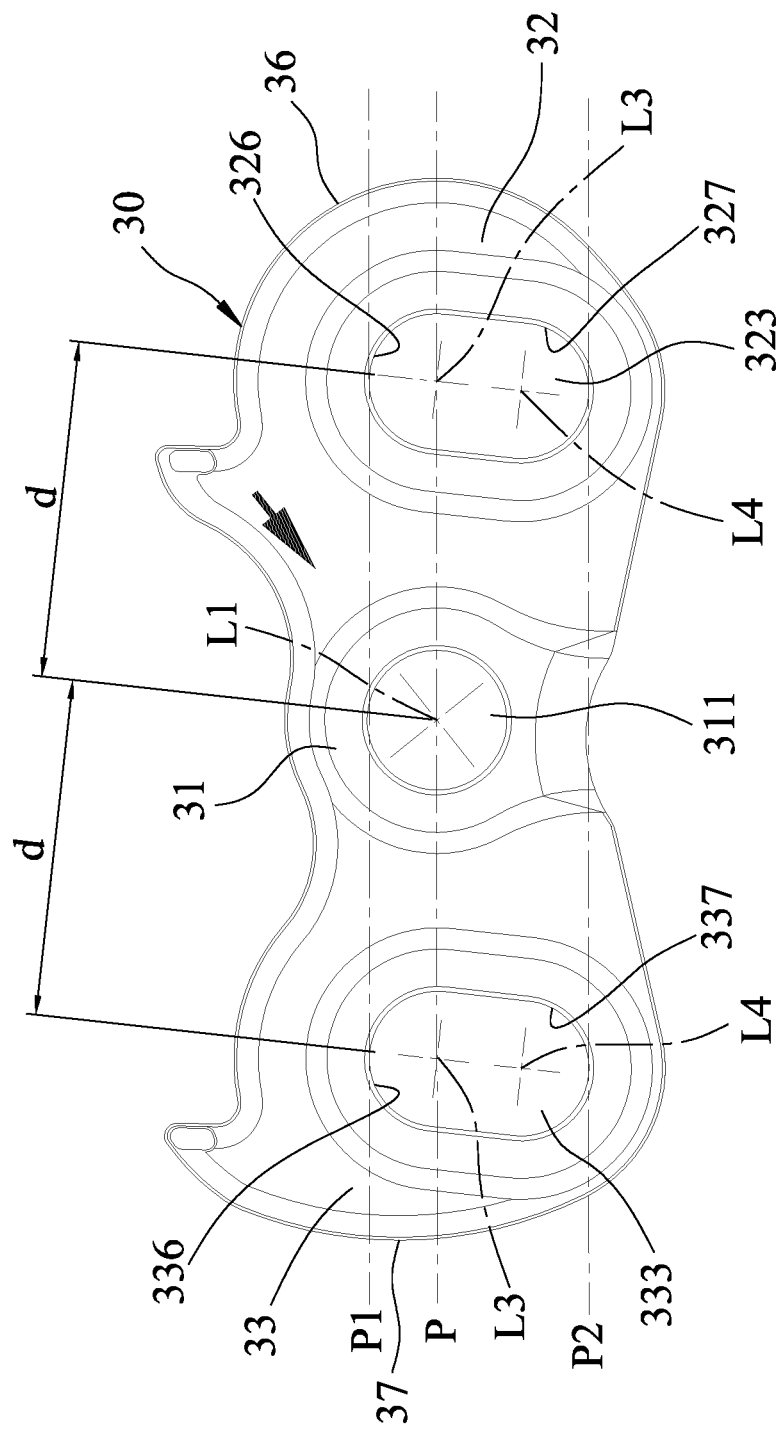
FIG. 6 is a plan view of an eye plate of the first embodiment.

It should be noted that, as shown in FIG. 6, the first arc axis (L3) of the first arc section 326 of the first elongated hole 323 and the first arc axis (L3) of the first arc section 336 of the second elongated hole 333 are coplanar with the center axis (L1) such that an imaginary plane (P) overlaps all three axes. In addition, the first arc sections 326, 336 of the first and second elongated holes 323, 333 are tangent to a first reference plane (P1), and the second arc sections 327, 337 of the first and second elongated holes 323, 333 are tangent to a second reference plane (P2). The first reference plane (P1) and the second reference plane (P2) are parallel to each other, and are parallel to the imaginary plane (P).

Figure 7:
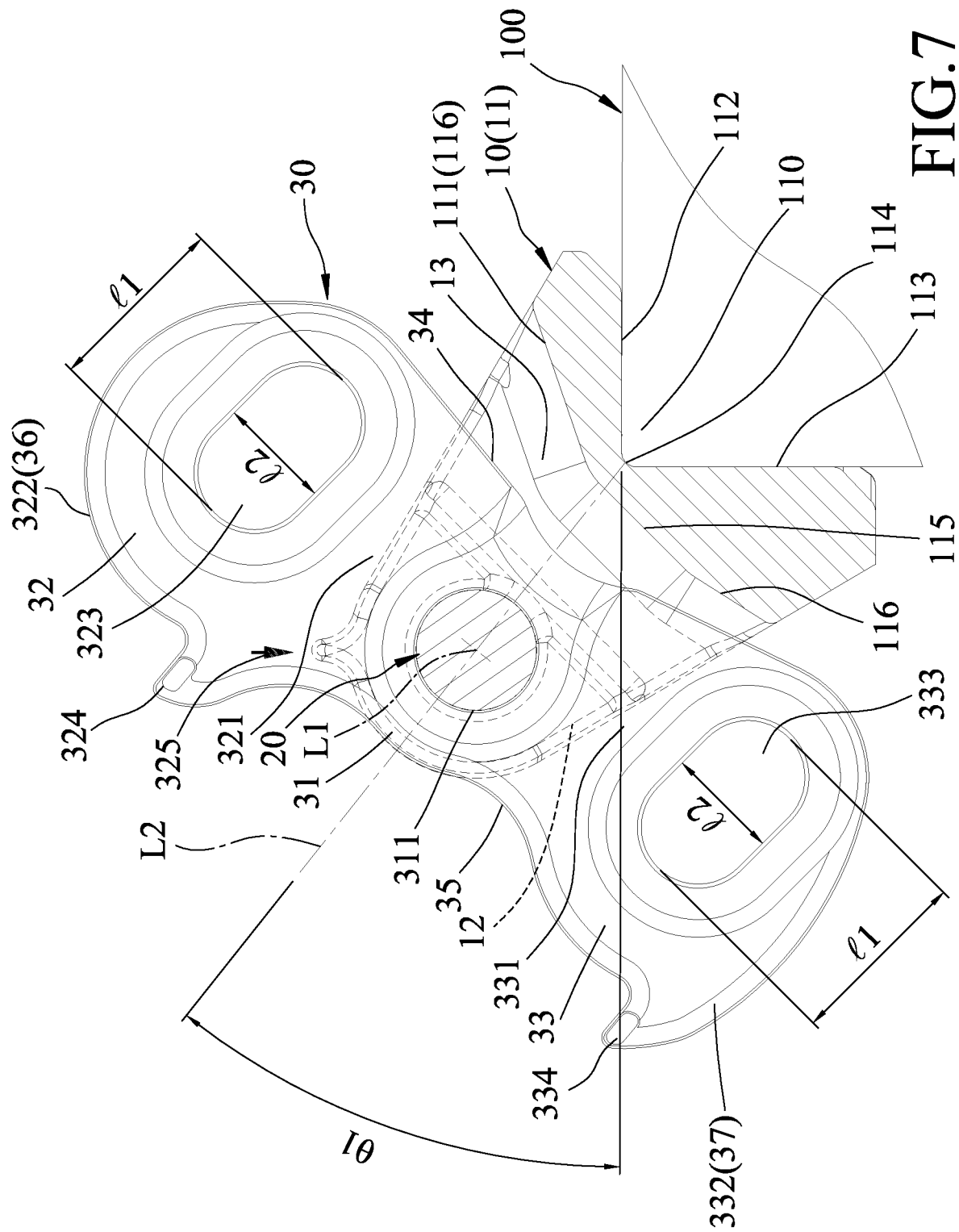
FIG. 7 is a sectional view of the first embodiment.
Figure 8:
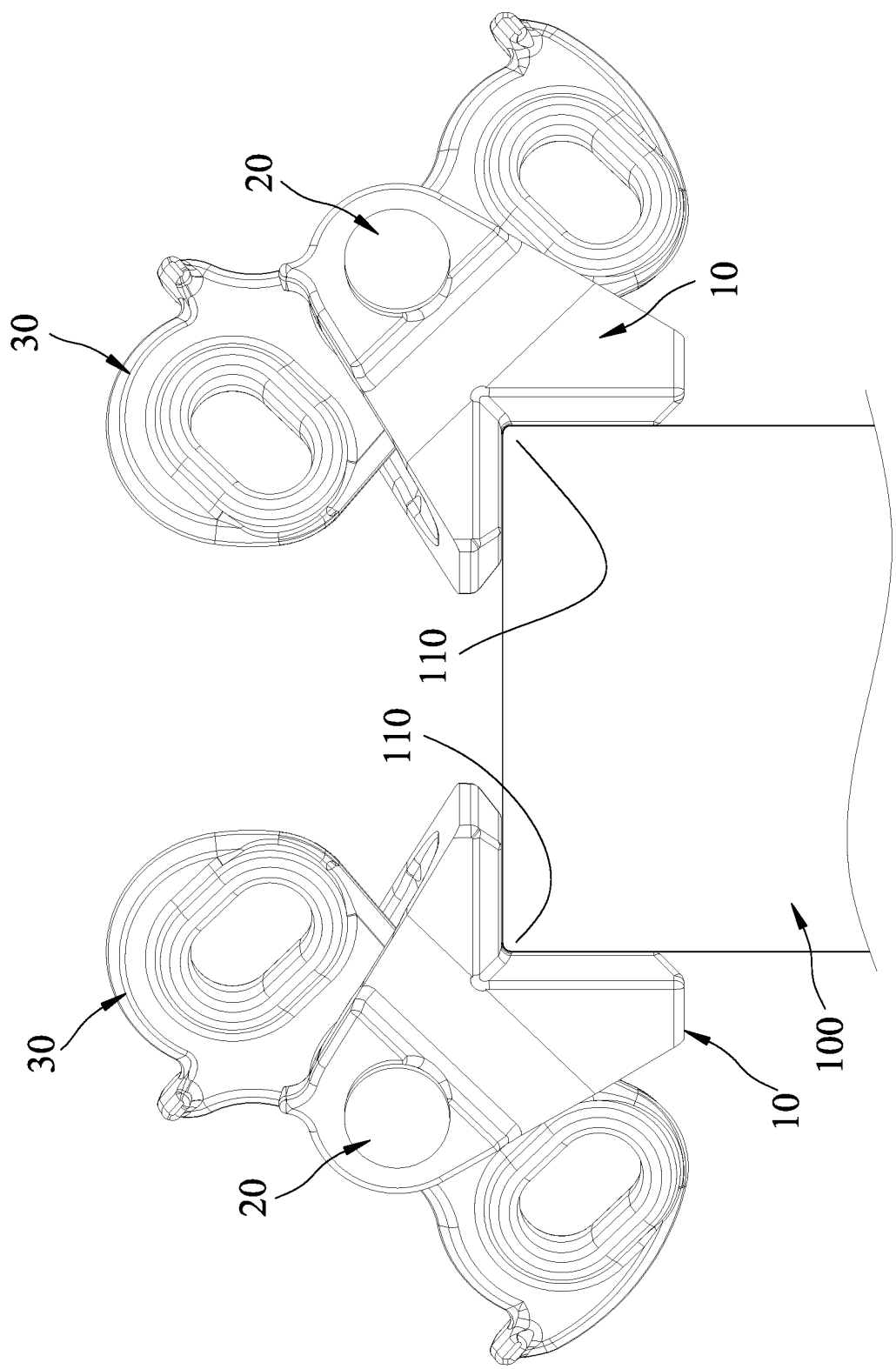
FIG. 8 is a side view illustrating the first embodiment being mounted to an upright post.
Figure 9:
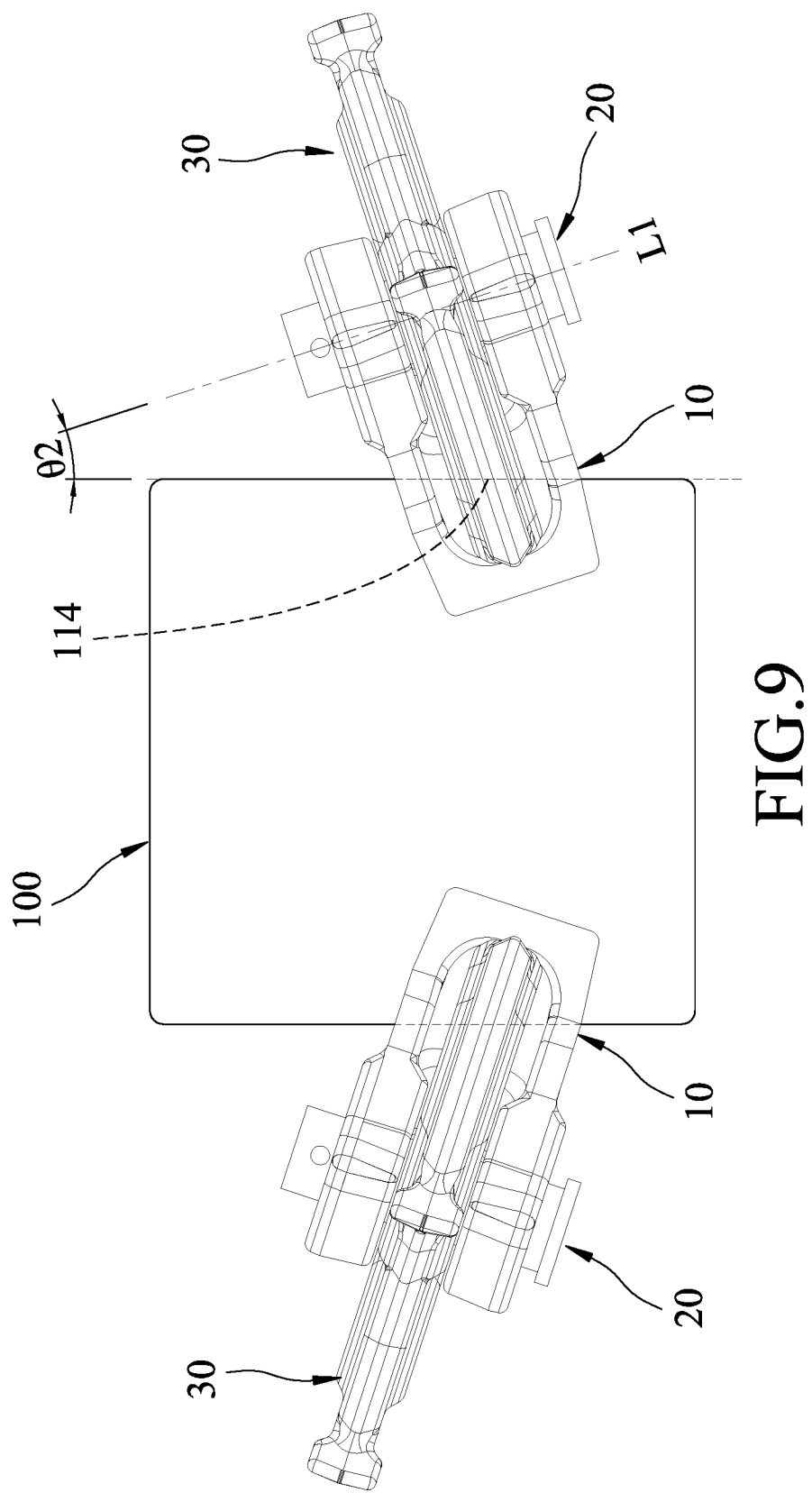
FIG. 9 is a top view illustrating the first embodiment being mounted to the upright post.

It should also be noted that, as shown in FIG. 7, each of the first elongated hole 323 and the second elongated hole 333 has a long axis length ($\ell 1$) that is measured between the bottom edge 34 and the top edge 35, and a short axis length ($\ell 2$) that is measured between the first side edge 36 and the second side edge 37. The long axis length ($\ell 1$) is greater than the short axis length ($\ell 2$). The first and second arc sections 326, 327 of the first elongated hole 323 are opposite to each other along a direction of the long axis length ($\ell 1$) of the first elongated hole 323. Similarly, the first and second arc sections 336, 337 of the second elongated hole 333 are opposite to each other along a direction of the long axis length ($\ell 1$) of the second elongated hole 333. The direction of the long axis length ($\ell 1$) of the first elongated hole 323 is parallel to that of the second elongated hole 333. The first arc axis (L3) of the first elongated hole 323 and the first arc axis (L3) of the second elongated hole 333 are equidistant from the center axis (L1), such that a distance (d) between the center axis (L1) and the long axis of the first elongated hole 323 is the same as a distance (d) between the center axis (L1) and the long axis of the second elongated hole 333 (see FIG. 6).

For further understanding of the configurations and effects of the present embodiment of the disclosure, details of the application of the embodiment are described as follows.

Referring to FIGS. 10 to 13, to secure a plurality of containers 6 that are stacked in rows and columns on a deck of a cargo ship, the base seats 10 of a plurality of the lashing devices are respectively welded and fixed to the end corners 110 of a plurality of the upright posts 100 on the deck, and a plurality of lashing rod units 3 are connected between the eye plates 30 of the lashing devices and the containers 6.

Specifically, each of the lashing rod units 3 includes a lashing rod 5, and a turnbuckle 4 configured for connection between the lashing rod 5 and the corresponding eye plate 30. More specifically, The lashing rod units 3 are grouped into pairs, and the lashing rod units 3 of each pair are connected between the eye plate 30 of one of the lashing devices and two adjacent containers 6 that are stacked vertically. Each of the lashing rod units 3 of the pair has one end that is pivotally engaged with a respective one of the first and second elongated holes 323, 333 of the eye plate 30, and the other end that is engaged with a corner casting 601 of a respective one of the two adjacent containers 6.

Figure 10:
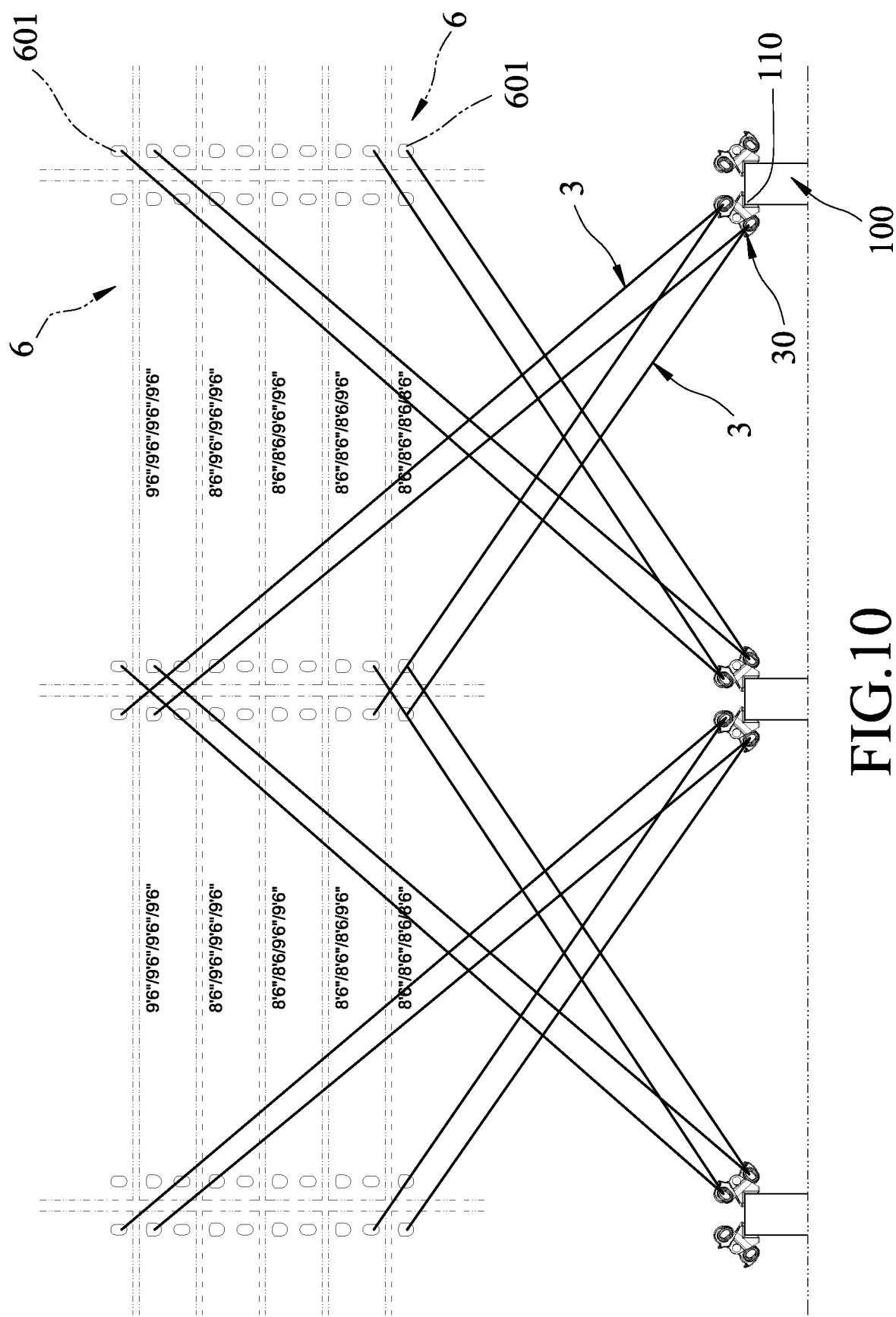
FIG. 10 is a schematic diagram illustrating the first embodiment being used with a plurality of lashing rod units for securing a plurality of containers.
Figure 11:
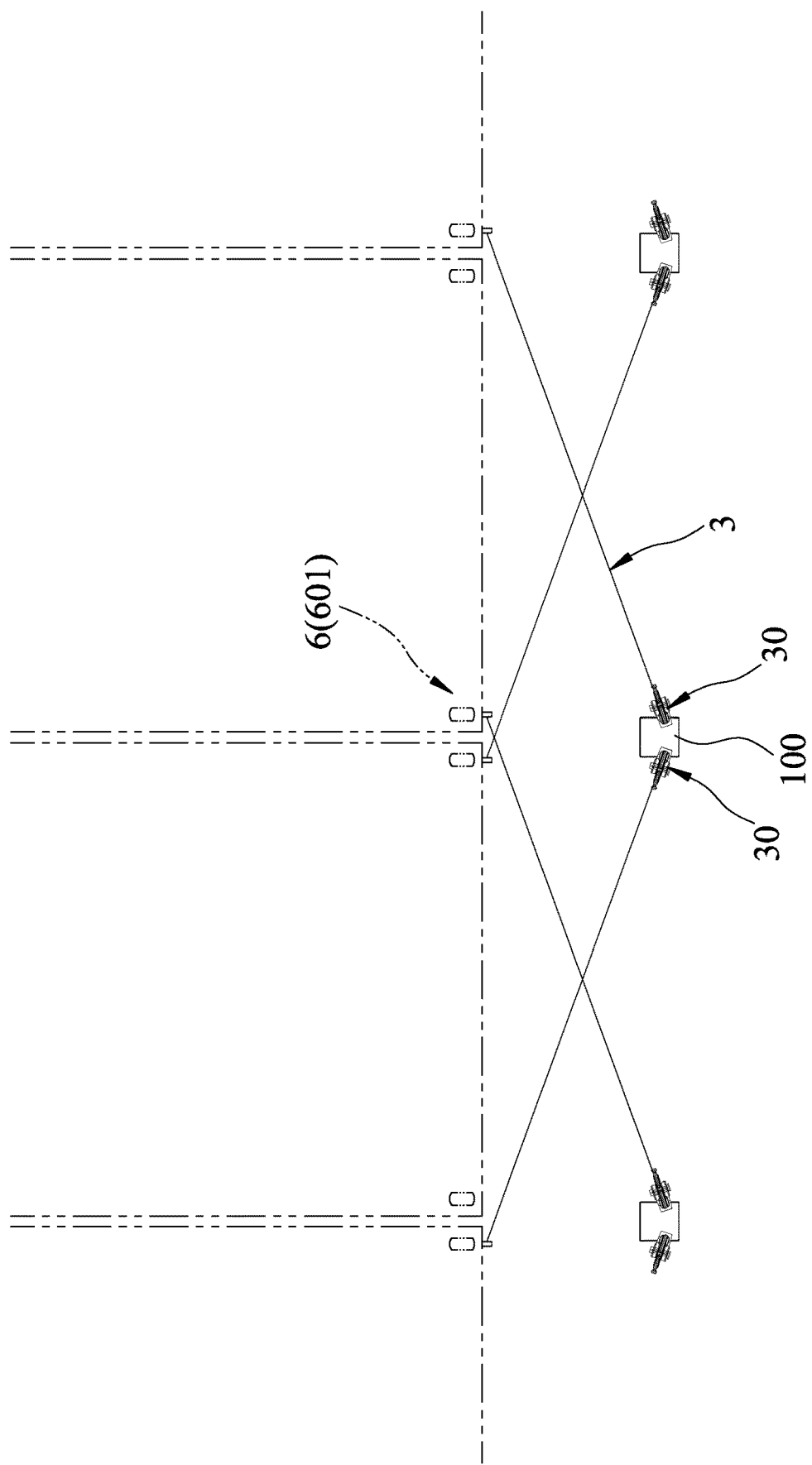
FIG. 11 is a schematic top view of FIG. 10.
Figure 12:
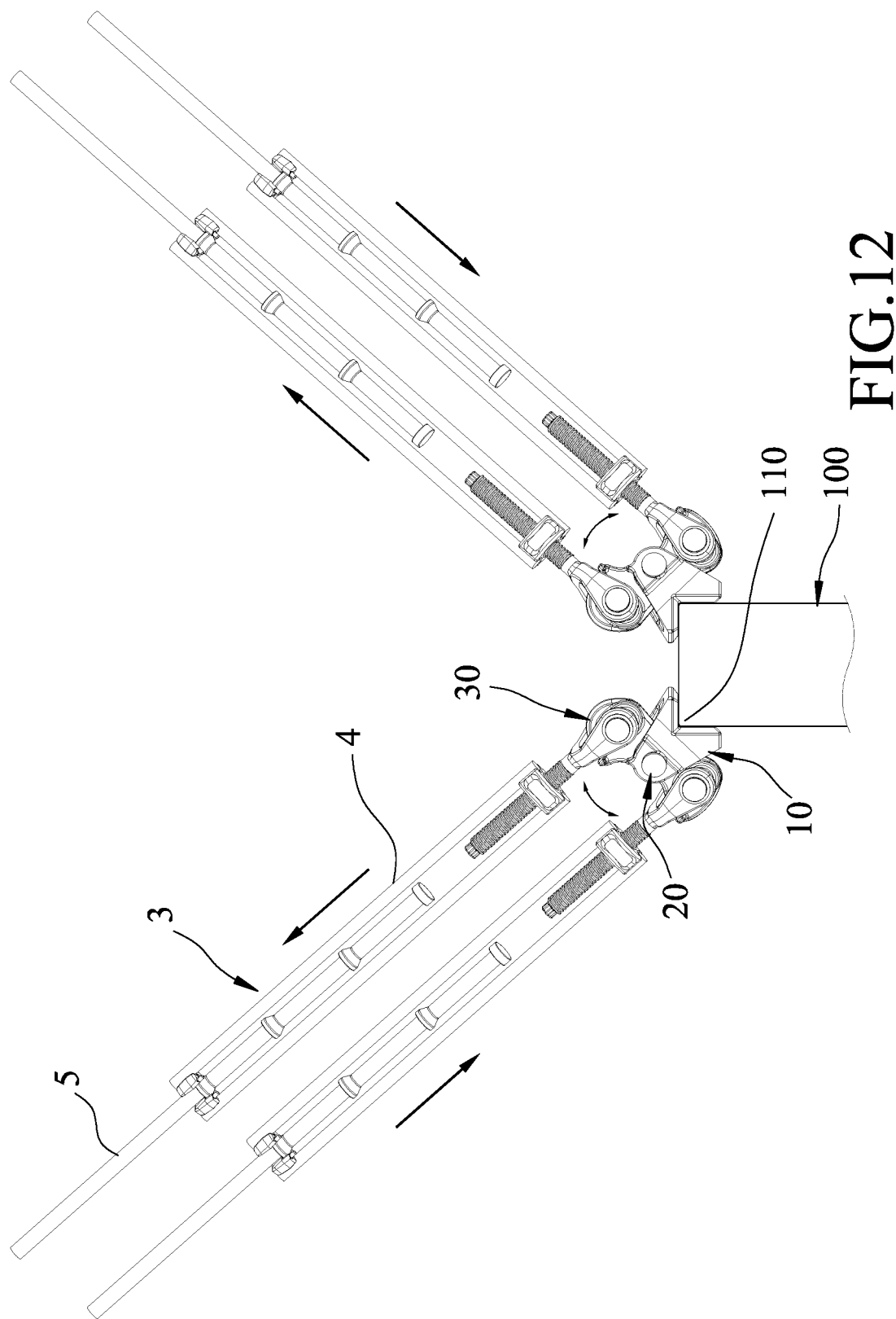
FIG. 12 is an enlarged fragmentary view of FIG. 10.
Figure 13:
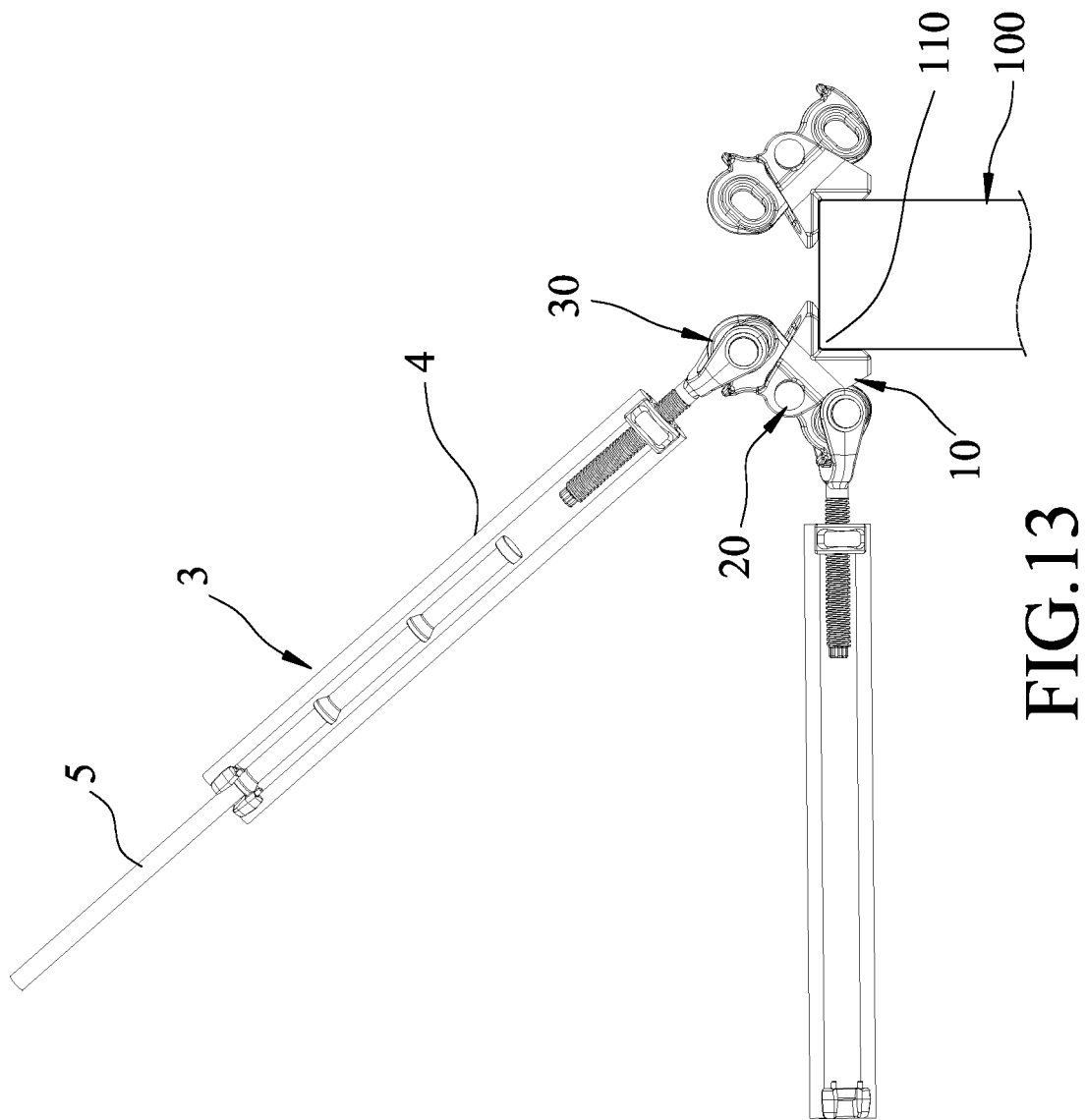
FIG. 13 is a schematic diagram illustrating the first embodiment in a different state of use.

Since the containers 6 are stacked and disposed at different heights, the lashing rod units 3 are inclined relative to the surface of the deck at different angles (see FIG. 10). In this regard, by virtue of configurations of the flat segment 115 and the slanted segments 116 of the top surface 111, and the eye plate 30 of each lashing device being pivotable relative to the base seat 10, a gap formed between and the top surface 111 of the base seat 10 and the bottom edge 34 of the eye plate 30 allows the eye plate 30 to rotate slightly relative to the base seat 10. As such, the eye plate 30 serves as a lever that equalizes the tension forces exerted on the lashing rod units 3 of the same pair (i.e., the eye plate 30 can pivot to a position where an angle formed between the eye plate 30 and one of the lashing rod units 3 of a pair is approximately the same as an angle formed between the eye plate 30 and the other one of the lashing rod units 3 of the pair), and thus the lashing rod units 3 are not subjected to unevenly distributed tension forces. It should be noted that, the gap formed between and the top surface 111 of the base seat 10 and the bottom edge 34 of the eye plate 30 is configured to allow for the pivotally movement of the eye plate 30, but is not wide enough to allow the fingers of an operator to be accidentally caught therebetween during operation.

Further, by virtue of the pivotal movement of the eye plate 30, a distance between the lashing rod units 3 of each pair remains approximately the same regardless of changes in inclination of the lashing rod units 3 relative to the surface of the deck, thus preventing the fingers of the operator from being caught between and injured by the lashing rod units 3.

In addition, by virtue of configurations of the first elongated hole 323 and the second elongated hole 333 of the eye plate 30, when the cargo ship encounters heavy winds or strong currents and becomes unstable, the lashing rod units 3 are allowed to slide within the first and second elongated holes 323, 333 of the eye plates 30, and the sliding movement of the lashing rod units 3 and the pivotal movement of the eye plate 30 cooperatively dampens the impact forces exerted on the lashing rod units 3 and the containers 6.

It should be noted that, during operation, combination of the indicator 325 of the eye plate 30 and the indicating segment 122 of the base seat 10 can be used as a reference to prevent the eye plate 30 from being installed in wrong directions. It should also be noted that, the first stopper 324 and the second stopper 334 of the eye plate 30 are configured to limit movement of the lashing rod units 3 such that the lashing rod units 3 can be positioned at a predetermined inclination angles. Furthermore, the configurations of the base seat 10 may be adapted in variations of the embodiment to form different tilt angle (θ1) and installation angle (θ2) suitable for different requirements. Finally, since a combined area of the first contact surface 112 and the second contact surface 113 of the base seat 10 is relatively small, a welding area between the base seat 10 and the upright post 100 is reduced compared with the prior art, and as a result, the costs for installation can be reduced.

Figure 14:
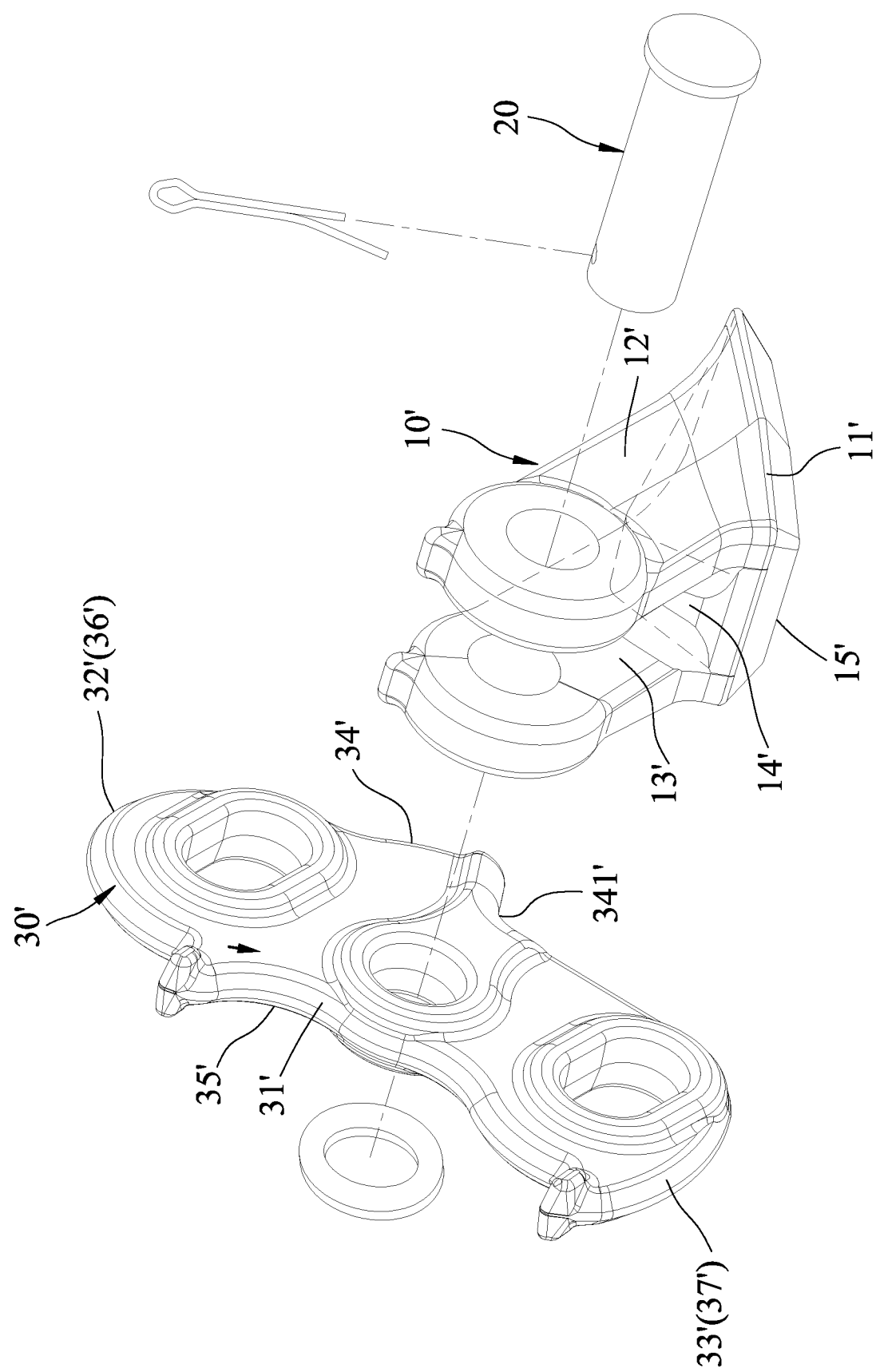
FIG. 14 an exploded perspective view of a second embodiment of the lashing device according to the disclosure.
Figure 15:
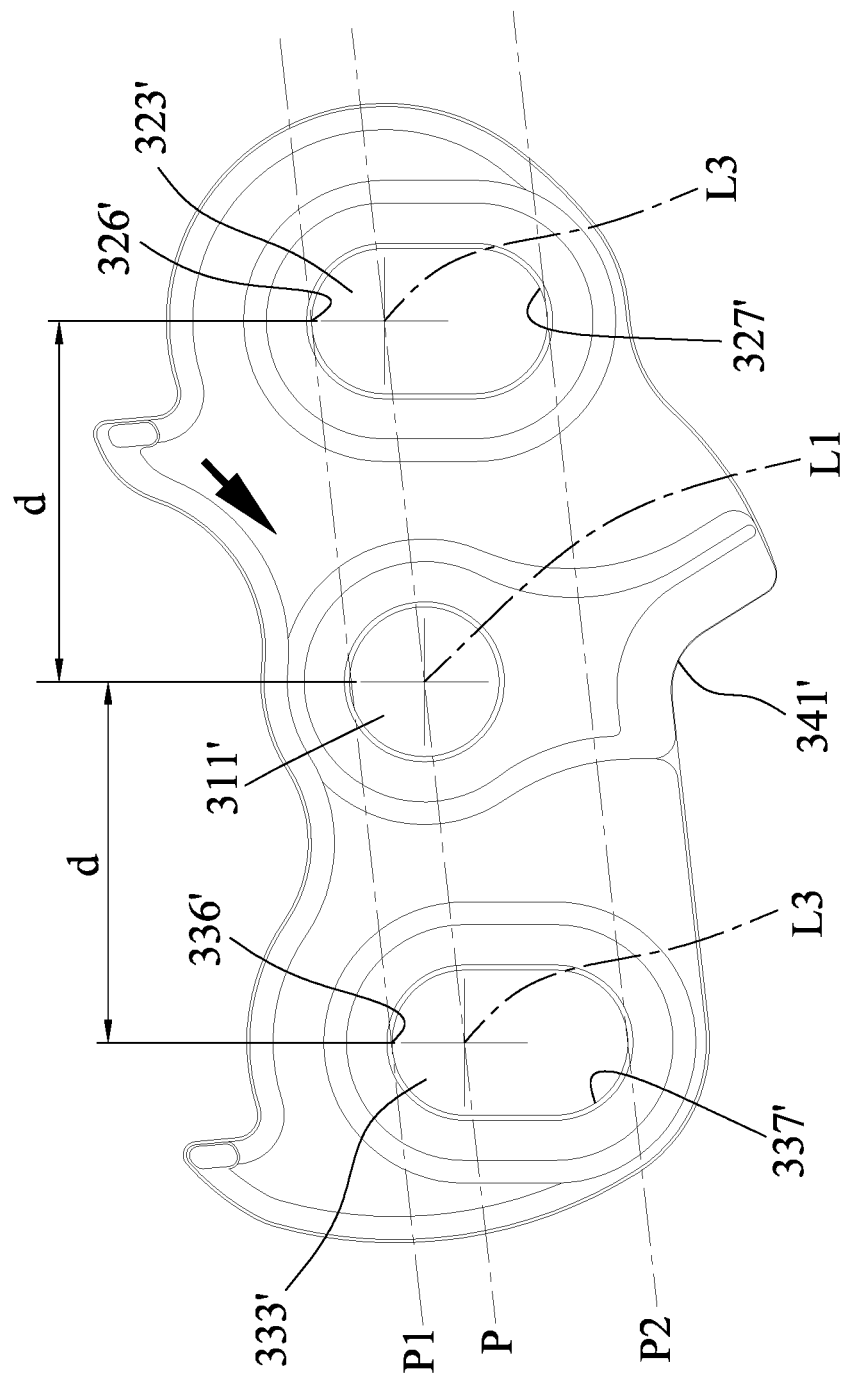
FIG. 15 is a plan view of an eye plate of the second embodiment.
Figure 16:
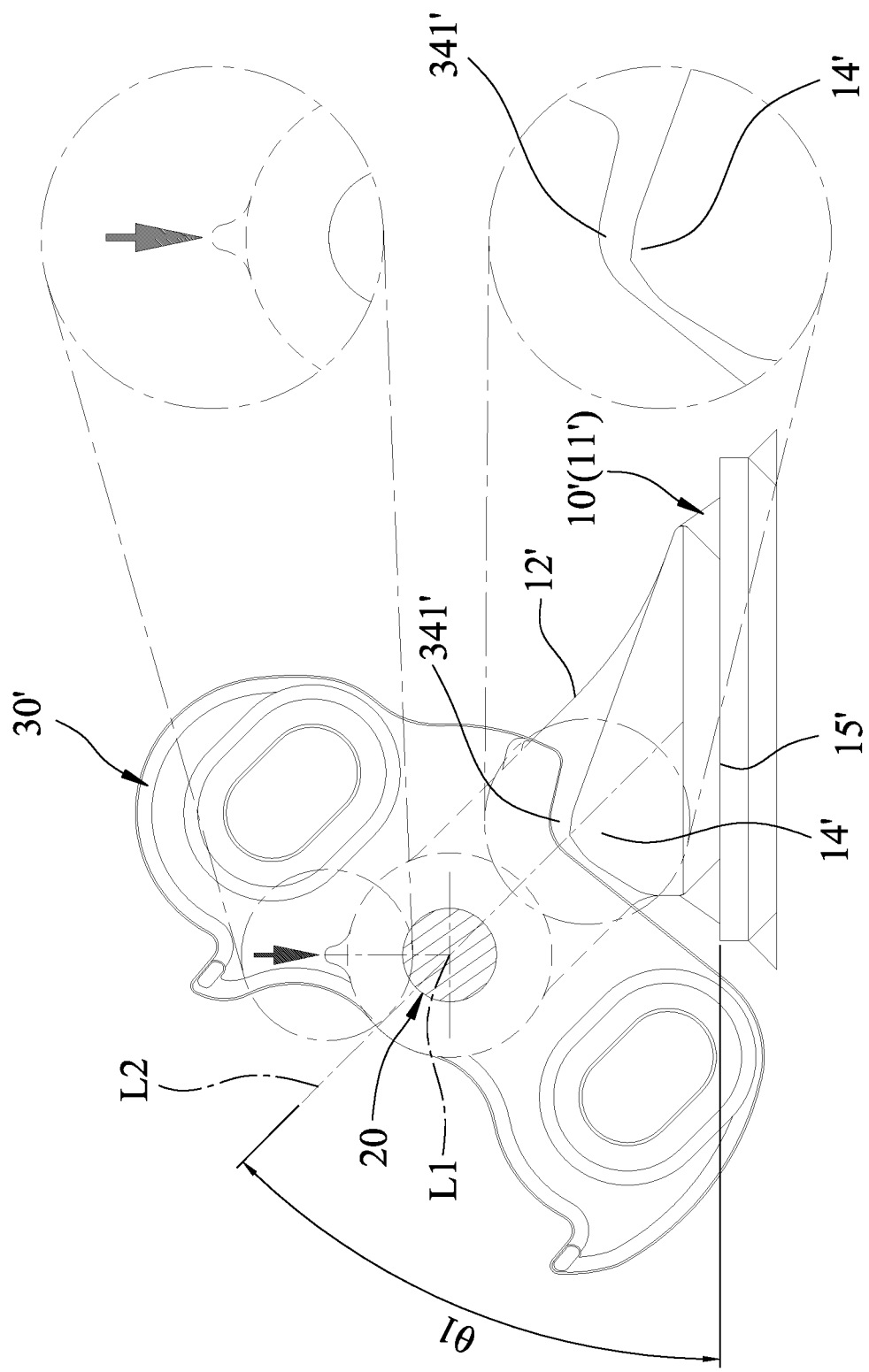
FIG. 16 is a sectional view of the second embodiment.
Figure 17:
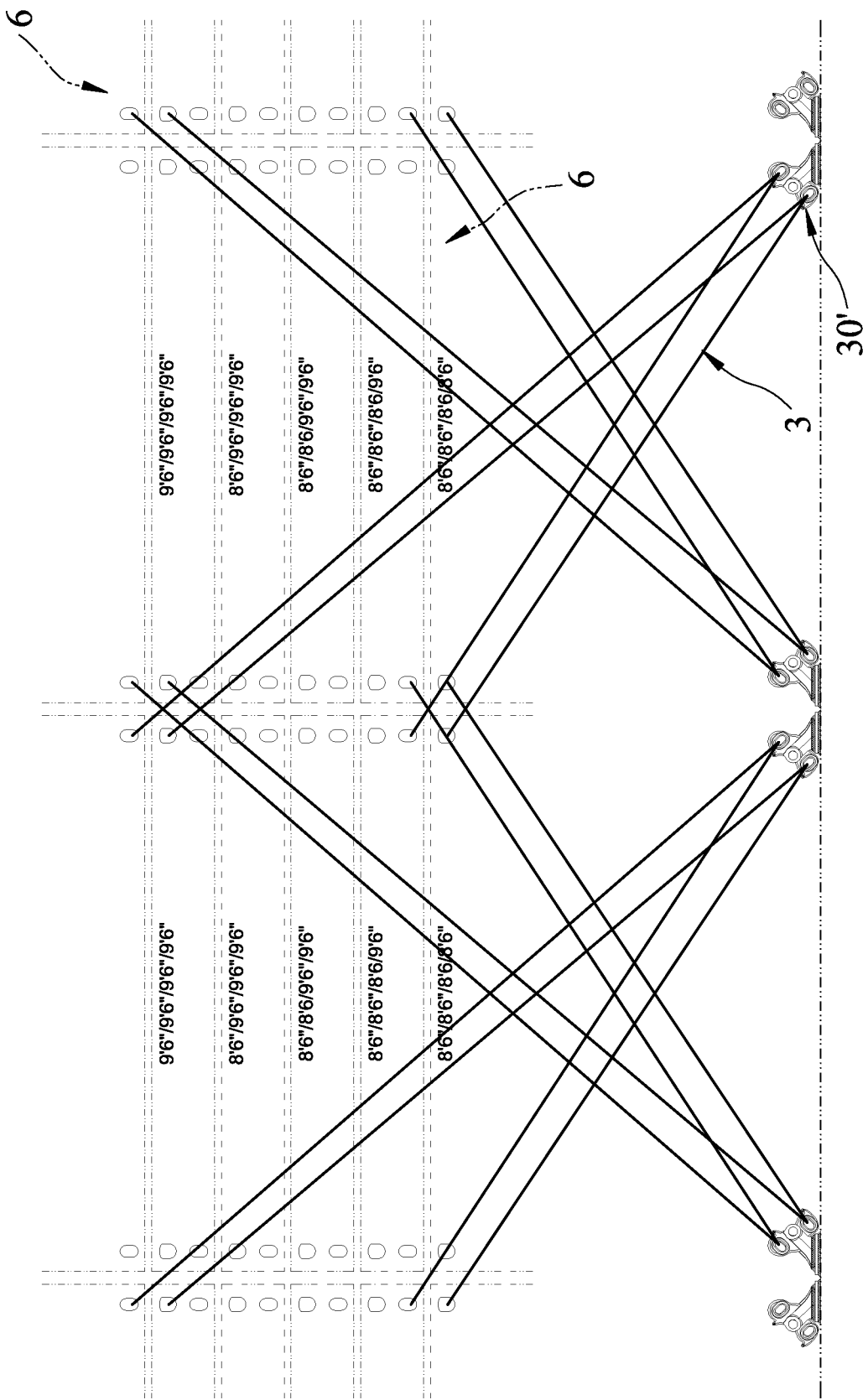
FIG. 17 is a schematic diagram illustrating the second embodiment being used with the lashing rod units for securing the containers.
Figure 18:
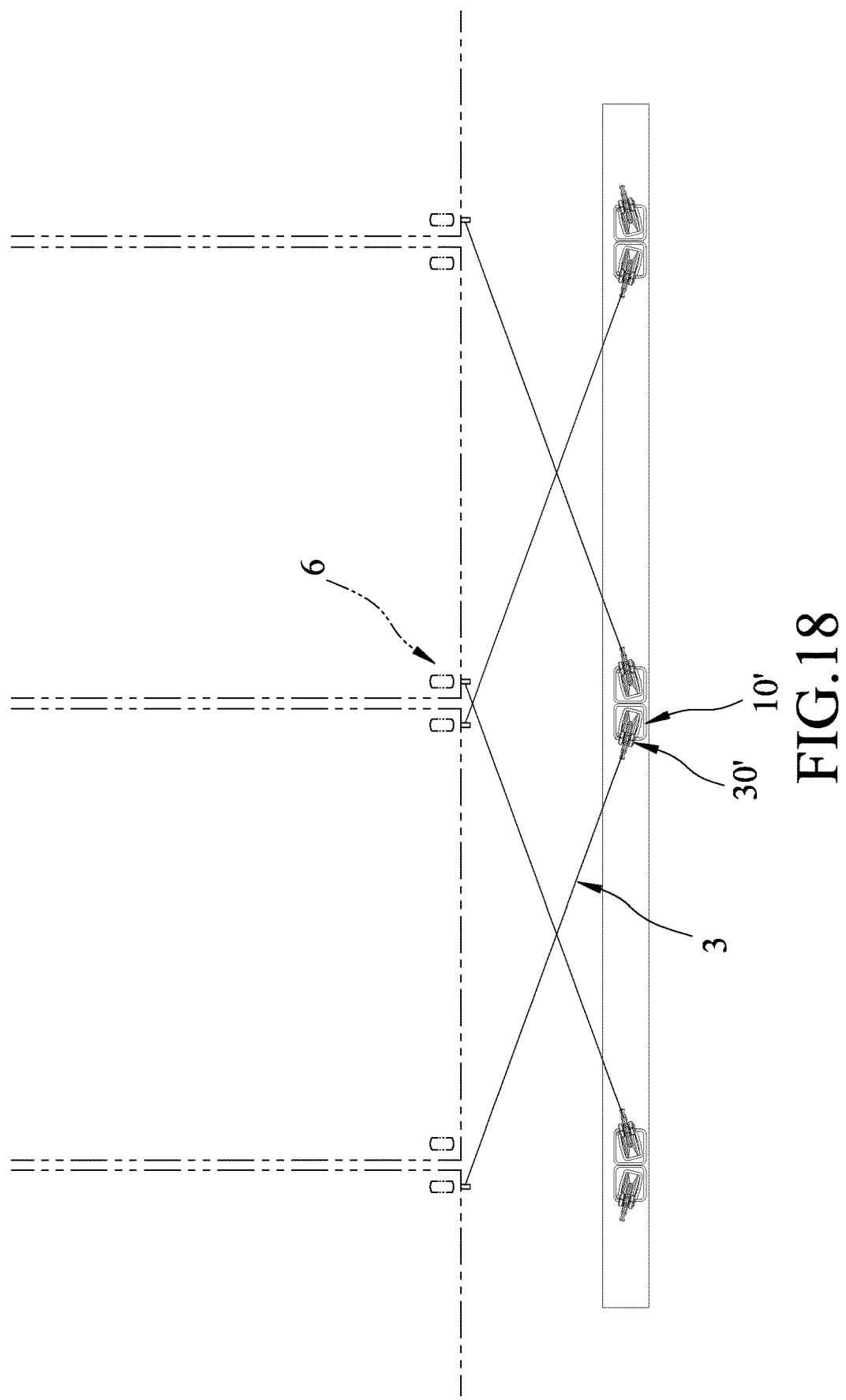
FIG. 18 is a schematic top view of FIG. 17.
Figure 19:
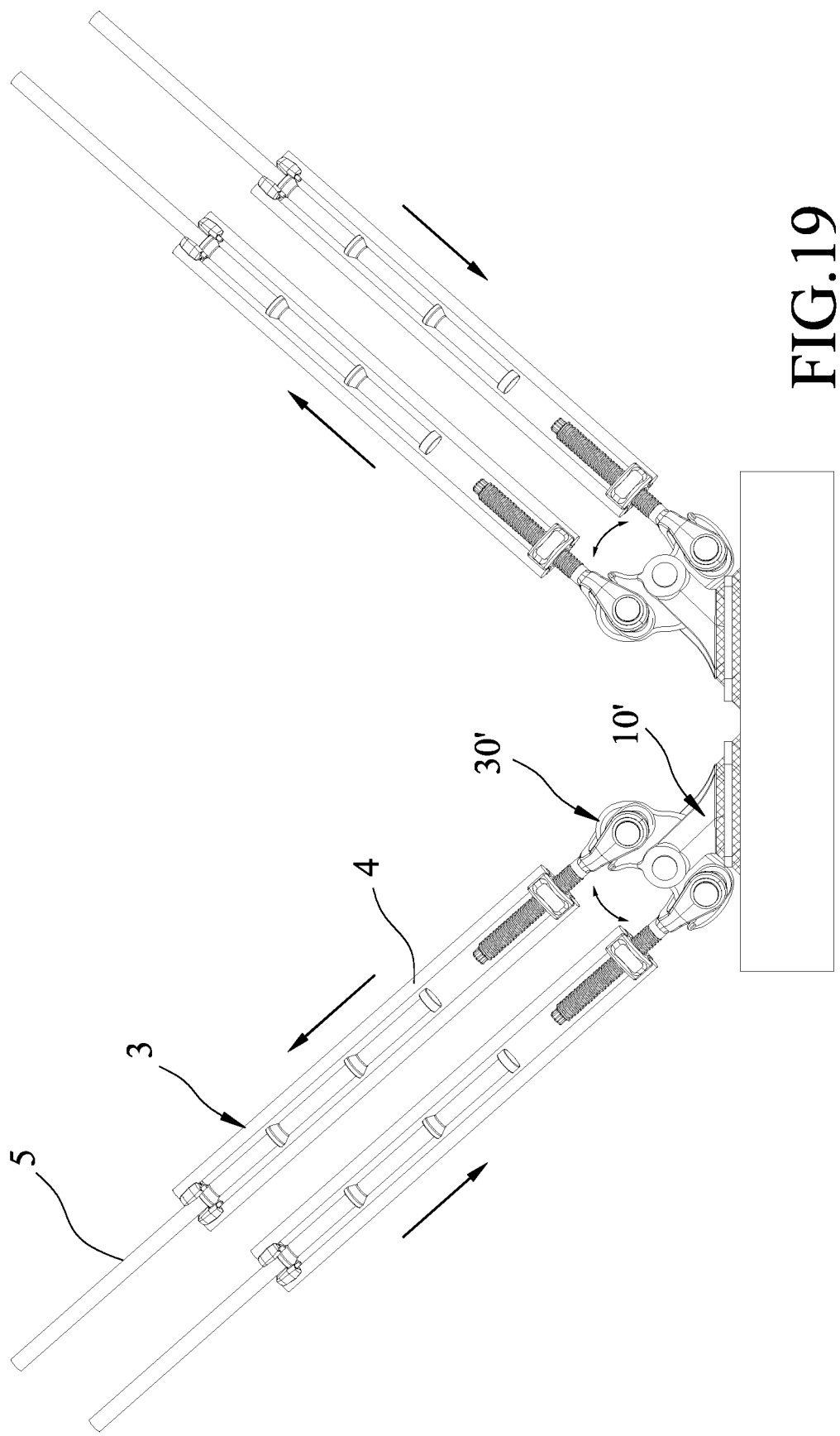
FIG. 19 is an enlarged fragmentary view of FIG. 17.
Figure 20:
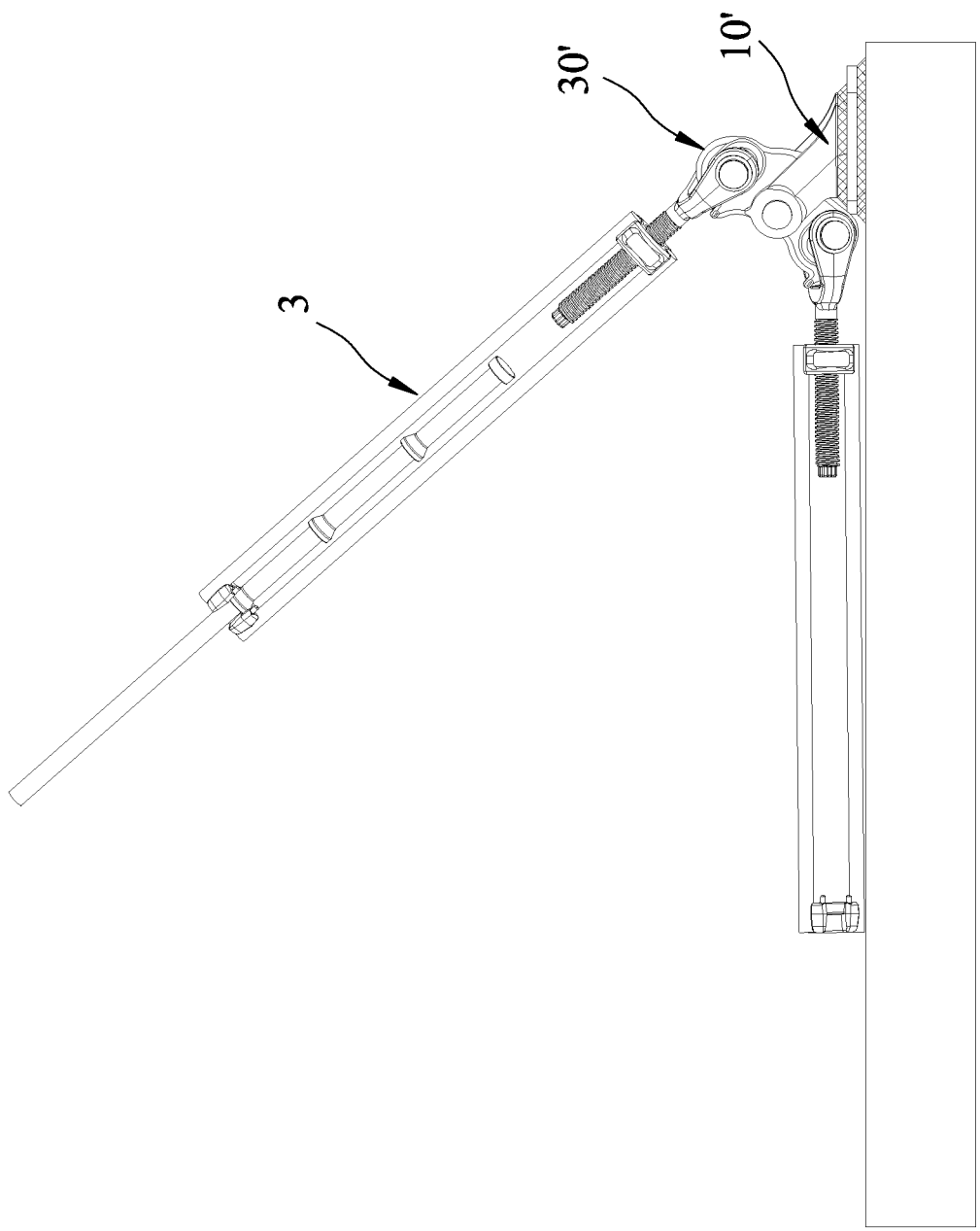
FIG. 20 a schematic diagram illustrating the second embodiment in a different state of use.

Referring to FIGS. 14 to 16, a second embodiment of the lashing device according to the disclosure is similar to the first embodiment, and the differences between the two are described as follows.

In the second embodiment, the lashing device is adapted to be fixed to a horizontally disposed square tube or similar items. The bottom portion 11' of the base seat 10' has a stopping portion 14' and a bottom surface 15'. The stopping portion 14' protrudes into the receiving space 13', and has a cross section that is perpendicular to the center axis (L1) and that is substantially triangular. The bottom surface 15' is opposite to the stopping portion 14', and is completely flat such that the bottom surface 15' can be fixed to a side surface of the square tube or other flat surfaces. The bottom edge 34' of the eye plate 30' is formed with a groove 341' that is substantially inverted V-shaped for receiving the stopping portion 14' of the base seat 10'.

Similarly in the present embodiment, the imaginary extending line (L2) of each of the pivot lugs 12' of the base seat 10' intersects the center axis (L1) of the pivot pin 20', and is inclined relative to the bottom surface 15' (see FIG. 16). As such, a tilt angle (θ1) is formed between the imaginary extending line (L2) of each of the pivot lugs 12' and the bottom surface 15', and ranges from 40 degrees to 50 degrees (preferably 45 degrees). In addition, the first arc axis (L3) of the first arc section 326' of the first elongated hole 323' and the first arc axis (L3) of the first arc section 336' of the second elongated hole 333' are coplanar with the center axis (L1), and are equidistant from the center axis (L1) (i.e., as shown in FIG. 15, the distance (d) between the center axis (L1) and the long axis of the first elongated hole 323' is the same as the distance (d) between the center axis (L1) and the long axis of the second elongated hole 333').

As such, referring to FIGS. 17 to 20, the second embodiment of the lashing device is adapted to be connected to the lashing rod unit 3 in a similar manner, and is able to provide the same functions and benefits as the first embodiment for securing the containers 6.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A lashing device comprising:
    a base seat having a bottom wall, and two spaced-apart pivot lugs that are connected to said bottom wall, and that cooperate with said bottom wall to define a pivot slot thereamong, each of said pivot lugs being formed with a pivot hole communicating with said pivot slot, said pivot holes extending along a center axis;
    a pivot pin extending through said pivot hole of each of said pivot lugs; and
    an eye plate received in said pivot slot, and having
        a middle portion that is formed with a pivot hole, said pivot pin movably extending through said pivot hole such that said eye plate is rotatable about said pivot pin relative to said base seat,
        a first wing portion that has a first connecting end connected to one of opposite ends of said middle portion, a first distal end being distal from said middle portion, and a first elongated hole disposed between said first connecting end and said first distal end, said first elongated hole having a first arc section centered at a first arc axis, and
        a second wing portion that has a second connecting end connected to the other one of said opposite ends of said middle portion, a second distal end being distal from said middle portion, and a second elongated hole disposed between said second connecting end and said second distal end, said second elongated hole having a first arc section centered at a first arc axis;
    wherein the first arc axis of said first arc section of said first elongated hole and the first arc axis of said first arc section of said second elongated hole are coplanar with the center axis, and are equidistant from the center axis.

2. The lashing device as claimed in claim 1, wherein said eye plate further has a bottom edge that is proximal to said bottom wall, a top edge that is opposite to said bottom edge, a first side edge that is connected between said bottom edge and said top edge and that is disposed at said first distal end of said first wing portion, and a second side edge that is connected between said bottom edge and said top edge and that is disposed at said second distal end of said second wing portion, each of said first elongated hole and said second elongated hole having a long axis length that is measured between said bottom edge and said top edge, and a short axis length that is measured between said first side edge and said second side edge, the long axis length being greater than the short axis length.

3. The lashing device as claimed in claim 2, wherein:
    said first elongated hole further has a second arc section centered at a second arc axis, said first and second arc sections of said first elongated hole being opposite to each other along a direction of the long axis length of said first elongated hole; and
    said second elongated hole further has a second arc section centered at a second arc axis, said first and second arc sections of said second elongated hole being opposite to each other along a direction of the long axis length of said second elongated hole, the direction of the long axis length of said first elongated hole being parallel to that of said second elongated hole.

4. The lashing device as claimed in claim 3, wherein said first arc sections of said first and second elongated holes are tangent to a first reference plane, and said second arc sections of said first and second elongated holes are tangent to a second reference plane, the first reference plane and the second reference plane being parallel to each other.

5. The lashing device as claimed in claim 4, wherein said bottom wall of said base seat has a first contact surface, each of said pivot lugs of said base seat extending along an imaginary extending line that intersects the center axis, and that is inclined relative to an imaginary extension of said first contact surface, a tilt angle formed between the extending line of each of said pivot lugs and the imaginary extension of said first contact surface ranging from 40 degrees to 50 degrees.

6. The lashing device as claimed in claim 5, wherein said bottom wall of said base seat further has a second contact surface that intersects said first contact surface on a corner line, and that is substantially perpendicular to said first contact surface, an imaginary plane that overlaps said corner line and said second contact surface being inclined relative to the center axis.

7. The lashing device as claimed in claim 4, wherein each of said pivot lugs of said base seat has an indicating segment, said first wing portion of said eye plate having an indicator that corresponds in position to said indicating segment.

8. The lashing device as claimed in claim 4, wherein:
    said bottom wall of said base seat has a stopping portion that protrudes into said pivot slot, and that has a cross section being perpendicular to the center axis and being substantially triangular; and
    said bottom edge of said eye plate is formed with a groove that is substantially inverted V-shaped for receiving said stopping portion of said base seat.

9. The lashing device as claimed in claim 8, wherein said bottom wall of said base seat has a bottom surface that is opposite to said stopping portion and that is completely flat.

10. The lashing device as claimed in claim 9, wherein each of said pivot lugs of said base seat extends along an imaginary extending line that intersects the center axis, and that is inclined relative to said bottom surface, a tilt angle formed between the extending line of each of said pivot lugs and said bottom surface ranging from 40 degrees to 50 degrees.

* * * * *